United States Patent [19]

Evans

[11] Patent Number: 4,686,850
[45] Date of Patent: Aug. 18, 1987

[54] METHOD AND APPARATUS FOR TESTING DRUMS

[76] Inventor: Robert G. Evans, P.O. Drawer 68, Harvey, La. 70059

[21] Appl. No.: 845,970

[22] Filed: Mar. 31, 1986

[51] Int. Cl.⁴ ............................................. G01M 3/10
[52] U.S. Cl. .................................................... 73/45.5
[58] Field of Search ...................... 73/45.5, 41.2, 41.3, 73/41.4, 49.2; 209/540, 545, 591

[56] References Cited

U.S. PATENT DOCUMENTS

| 1,421,562 | 7/1922 | Raftery | 73/41.2 |
| 1,456,094 | 5/1923 | Chalmers | 73/45.5 |
| 2,432,814 | 12/1947 | Schmidt | 73/45.5 |
| 3,033,024 | 5/1962 | Kradoska | 73/49.2 |

FOREIGN PATENT DOCUMENTS

| 421044 | 2/1925 | Fed. Rep. of Germany | 73/45.5 |
| 422692 | 3/1911 | France | 73/45.5 |
| 195105 | 4/1938 | Switzerland | 73/45.5 |
| 12049 | of 1911 | United Kingdom | 73/45.5 |
| 2075202 | 11/1981 | United Kingdom | 73/49.2 |

Primary Examiner—Stewart J. Levy
Assistant Examiner—Joseph W. Roskos
Attorney, Agent, or Firm—Sherman Levy

[57] ABSTRACT

There is provided a method and apparatus for testing drums such as steel drums, wherein the drums are moved automatically into a pre-determined area, and the drums are rotated and oriented, air under pressure is next introduced into the drums, and wherein after an operator observes the drums for leaks, the drums are mechanically lifted from a water filled area. The method and apparatus can be utilized as a dum submerged tester for handling a plurality of drums, or the method and apparatus can be for a single drum submerged tester.

20 Claims, 6 Drawing Figures 4,686,850

METHOD AND APPARATUS FOR TESTING DRUMS

BACKGROUND OF THE INVENTION

1. Field of the Invention

The present invention relates to the testing of drums or containers and wherein the machine or apparatus can be a multiple automatic submerged tester, or else the principles of the machine can be utilized in a single automatic submerged tester.

2. Disclosure of the Prior Art

Heretofore various types of container testers have been provided, and exemplary of the prior art are the following patents:
U.S. Pat. No. 369,539, W. B. Mann
U.S. Pat. No. 1,372,690, R. O. Henszey
U.S. Pat. No. 3,270,552, H. L. Davis
U.S. Pat. No. 3,350,919, R. L. Mucci, et al
U.S. Pat. No. 3,550,432, P. H. Gundal, et al
U.S. Pat. No. 4,419,883, N. E. Gelston, II However, neither these prior patents nor any others known to applicant disclose applicant's inventive concept.

SUMMARY OF THE INVENTION

It is an object of the present invention to provide a method and apparatus which is practical for larger containers such as steel drums.

A further object of the present invention is to provide a drum testing method and apparatus that can be utilized as a multiple automatic submerged tester, as well as a single automatic tester.

A still further object of the present invention is to provide a drum tester that is ruggedly constructed and efficient to use and which can be manufactured and operated with minimum expense.

Still further objects and the entire scope of the applicability of the present invention will become apparent from the detailed description given hereinafter. It should be understood, however, that the detailed description and specific examples are given by way of illustration only and, while indicating the preferred embodiments, are not given by way of limitation because various changes and modifications within the spirit and scope of the invention will become apparent to those skilled in the art from this detailed description.

DESCRIPTION OF THE PREFERRED EMBODIMENTS

Figure 1:
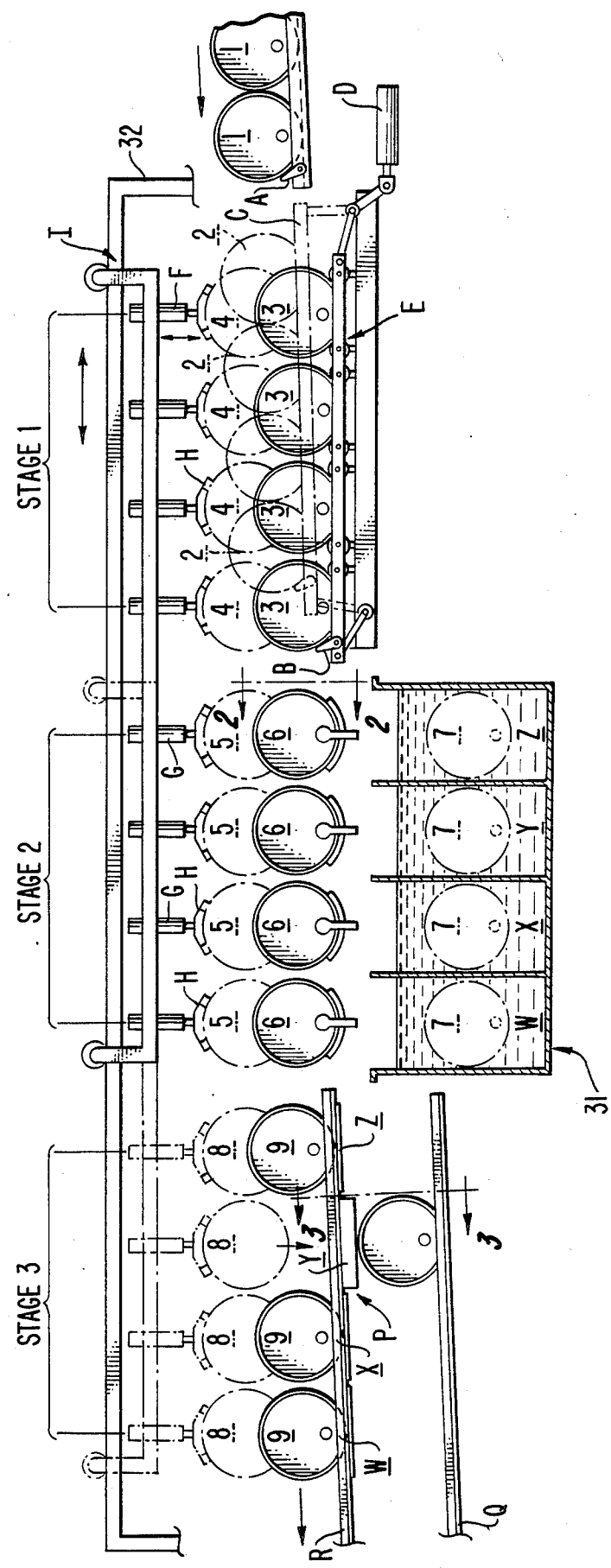
FIG. 1 is a side elevational view of a multiple automatic submerged tester constructed in accordance with the present invention.
Figure 2:
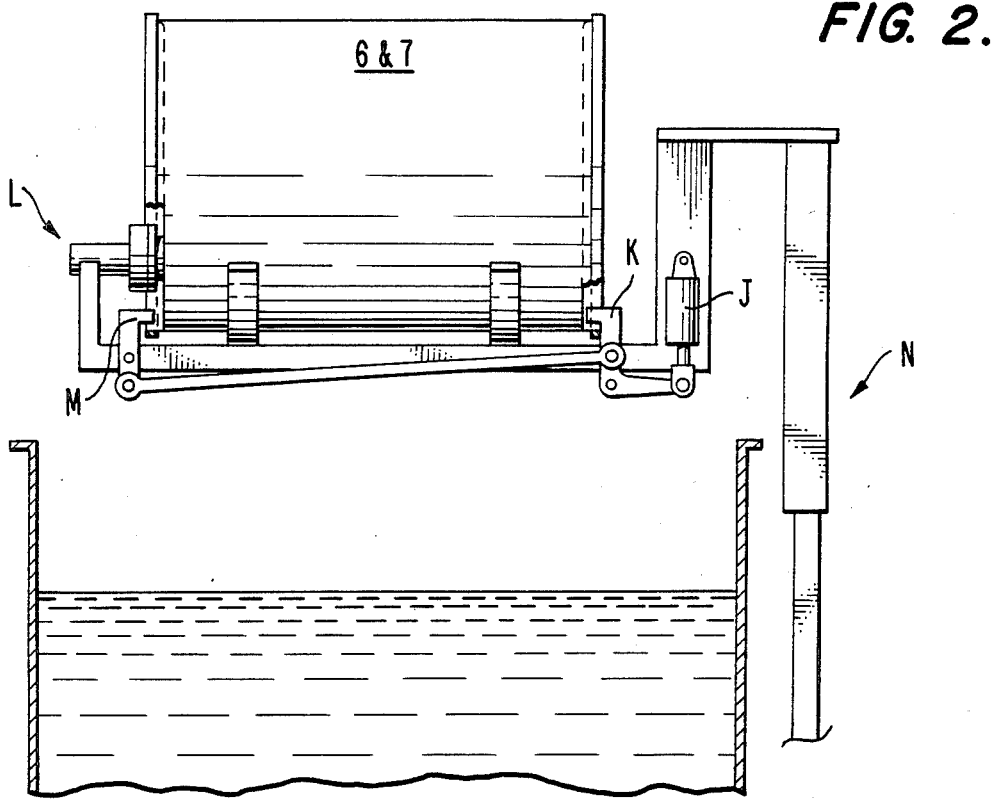
FIG. 2 is a sectional view taken on line 2—2 of FIG. 1.
Figure 3:
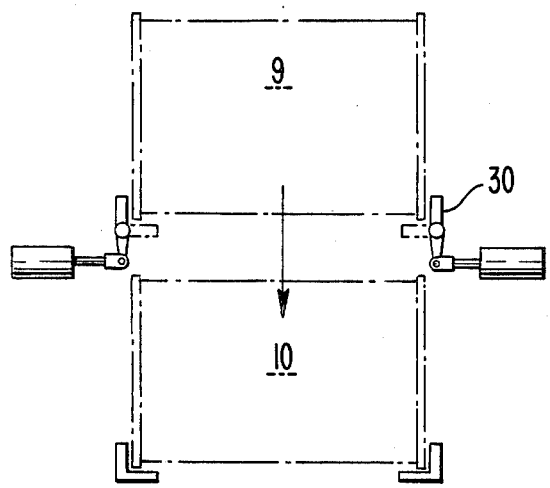
FIG. 3 is a view generally taken on line 3—3 of FIG. 1.

Referring now in detail to the drawings, and more particularly to FIGS. 1, 2, and 3 of the drawings, there is illustrated a multiple automatic submerged tester. In stage 1, drums are fed from position 1 to position 2 on a pivot conveyor C by alternating stops A and B, FIG. 1. Air cylinder D lowers the drums from position 2 to position 3 to bung locating rollers E. Cylinders F and electromagnets H raise the drums to position 4 for shuttle to stage 2 by carriage I.

Attention is directed to stage 2, in FIG. 1 of the drawings wherein the drums are lowered from position 5 to position 6 by cylinders G and electromagnets H. At position 6, cylinder J, FIG. 2, pushes drum onto test air inlet L with dog K. Machine N moves drums from position 6 to position 7. After the drum test machine N moves the drums from position 7 to 6, air cylinders G and electromagnets H move drums from position 6 to position 5 for shuttle to stage 3 by carriage I.

Attention is further directed to stage 3 in FIG. 1 wherein the drums are lowered from position 8 to position 9 by cylinders G and electromagnets H. Air cylinder P drops reject drum to lower conveyor Q. Drums at position 9 move out of stage 3. Carriage I then returns to stage 1.

With further reference to FIG. 1, the operator notes leaking drum at position 7 and pushes the proper button to open above reject gates W through Q to drop drum from position 9 to position 10. In FIG. 3, the numeral 30 indicates swing gates.

With further reference to FIG. 2, L indicates the rubber sealed test air inlet over the bung. As shown in FIG. 2, the dog K pushes the drum and holds the same on the test air inlet. The dog M does not touch the drum laterally, and prevents the drum from rising only. Also in FIG. 2, the vertical rack and pinion machine frame N is provided to raise and lower the drums between positions 6 and 7. The air cylinder J is provided to clamp the drum in position over the test air inlet.

In FIG. 1, the numeral 31 indicates water test tanks.

Also as shown in FIG. 1, the electromagnets H hold and release the drums as required. In FIG. 1 the carriage I rolls on the machine frame driven by the rack and pinion system. The numeral 32 in FIG. 1 illustrates the machine frame to the floor. The air cylinders F raise and lower the drums as required. The brake motor driven rollers E rotate the drum until an electronic sensor locates the bung at the 6 o'clock position.

Figure 4:
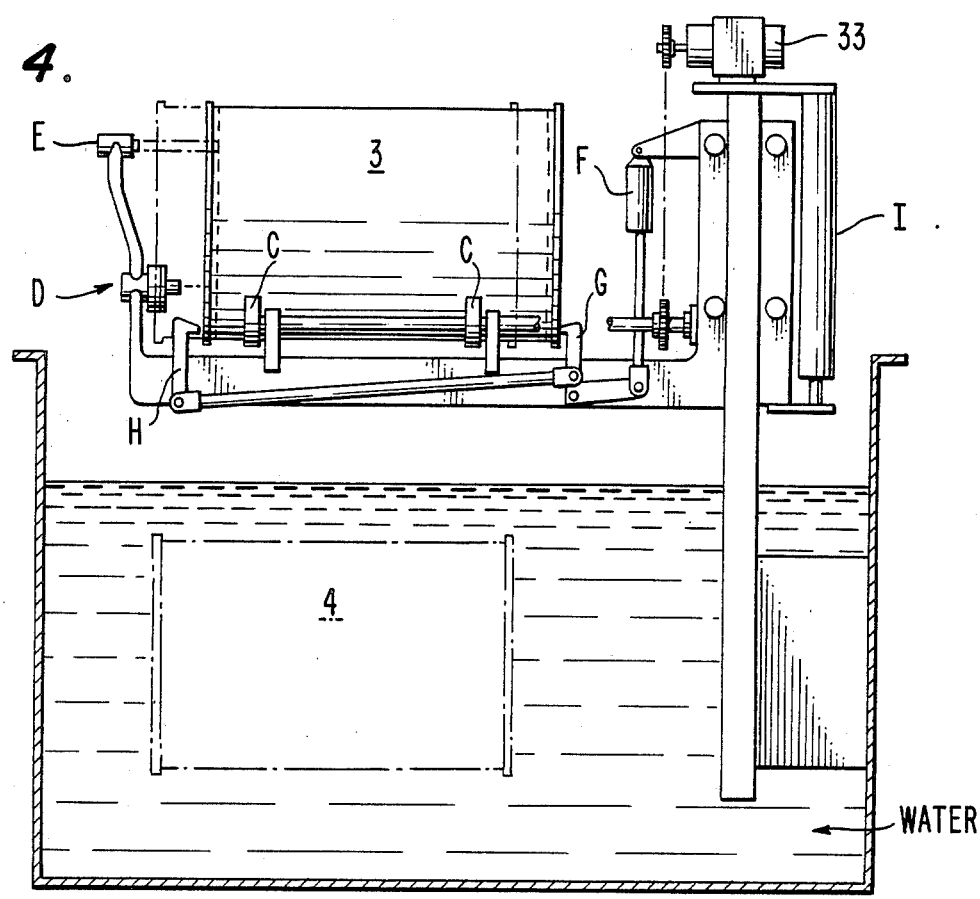
FIG. 4 is an elevational view, with parts broken away and in section, illustrating a single automatic submerged tester.
Figure 5:
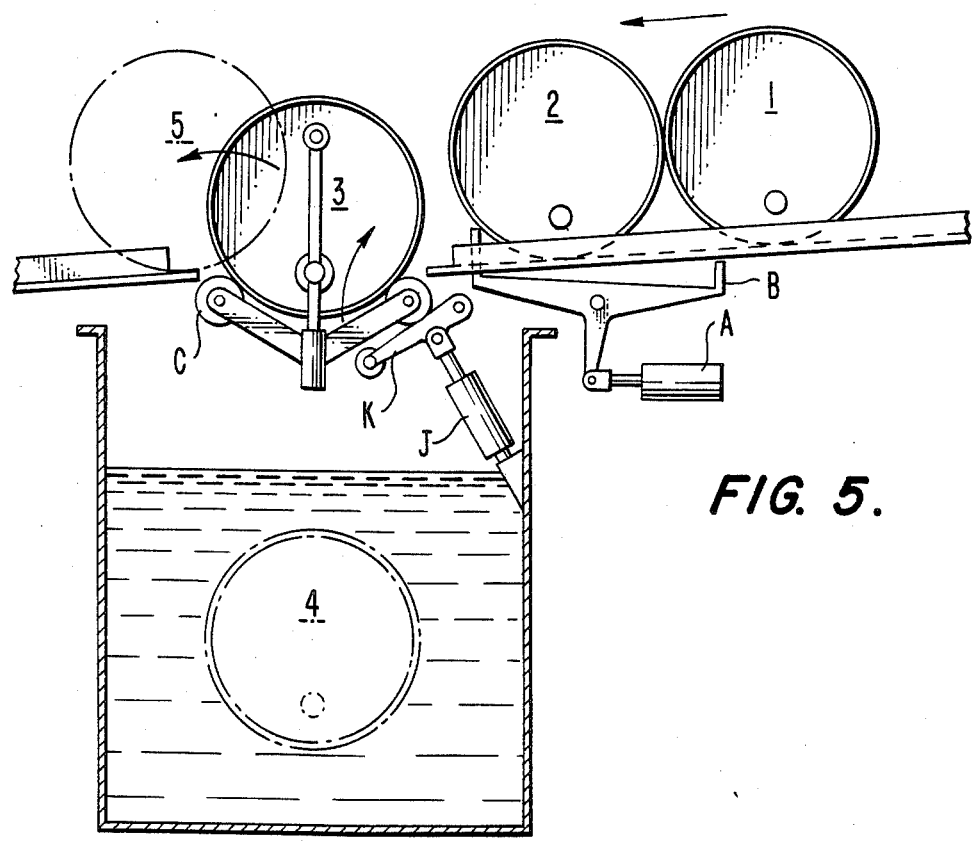
FIG. 5 is a view generally taken at right angles to the view shown in FIG. 4.

Attention is directed to FIGS. 4 and 5 of the drawings wherein there is illustrated a single drum submerged tester. In FIGS. 4 and 5, air cylinder A retracts to tilt escapement B which allows drum to move from position 2 to position 3. Cylinder A extends allowing drum 1 to move to position 2. Motor driven rollers C rotate drum 3 until an electronic sensing light locates the drum vent fitting which stops drum rotation. Air cylinder F pulls dog G forcing drum opening against air inlet D. Dog H only keeps drum from rising. The cylinder I lowers the pressurized drum under water for test at position 4. The cylinder I raises the drum 4 to position 3. The cylinder F extends allowing drum 3 to move away from air inlet D. The cylinder J extends rotating arm K which moves drum 3 to position 5. Cylinder J and arm K retract. The cycle begins action.

In FIG. 4, the numeral 33 indicates a bung orientation motor.

The parts can be made of any suitable material and in different shapes or sizes as desired or required.

It is to be emphasized that the present invention is practical for large containers such as steel drums. Most of the steel drums in the United States are in the 55 gallon size which, as a matter of fact, usually hold by absolute volume approximately 57½ gallons.

Also, a much smaller number are in the size of 30 gallon, 20 gallon, 15 gallon, and the like. There are also a very small amount of so called 57 to 60 gallon drums.

The testing machine and method according to the present invention would be used in the majority of cases for the 55 gallon drums, although it could be used for 30, 20, and 15 as well as the 57 or 60 gallon size. Presently a 55 gallon and related sizes are being tested by the following methods:

In the case of a new steel drum, the drum is clamped between two pressure plates and the area is admitted to approximately 7 pounds pressure after the drum is turned in a fashion that the welded seam is up and exposed to the operator.

The operator will spray or use a brush to apply water or soap suds over the entire welded seam of the cylinder of the drum and also approximately one inch on either side of the welded seam in the area of the rolled in end seam of the drum. This has an advantage of being very fast and reasonably accurate as to testing the end seams and the welded side seam, but it does not test other major areas of the drum which fortunately are much less vulnerable to leakage (in new steel drums).

By way of example, another method is to use a process of pressurizing the drum to about 7 p.s.i. and using sensitive air measuring devices and gauges to register any pressure loss in the drum due to a leak. Some people call this a "differential of air method" or a "differential of pressure method" and some such machines are being manufactured that are totally automatic. This has an advantage that the machine can be totally automatic and that it tests the entire surface of the drum including the welded seam. It is much more expensive, however, its major fault is that it cannot detect successfully an extremely small leak, particularly where high speed operation is required as at most drum manufacturing plants.

On reconditioned drums, the testing with soap suds method such as used with new drums is not usually used for the reason that a used drum is much more susceptible to leakage in all parts of the drum, other than just the welded side seam.

It is to be noted that there have been some attempts to use a differential of pressure method, for reconditioned drums but this has not been successful for a number of reasons including the fact that reconditioned drums are not as uniform, and furthermore, reconditioned drums are more susceptible to tiny leaks than new drums.

Previously for reconditioned drums the most practical and almost universally used method is to submerge the drums one at a time in a single tank containing water while the drum is pressurized at approximately 7 pounds per square inch. The machine is usually operated by one man who inserts a quick acting sealing device into the larger (2 inch plug) of the drum, presses a button which automatically admits up to 7 pounds of air into the drum and which also actuates an air cylinder that pushes the drum which is clamped to a carriage down below the surface of the water. After the drum is completely submerged, a timing device holds the drum down for the amount of time set, which in most cases is approximately 15 seconds.

The operator detects leaks by noticing bubbles that float up to the top of the water. In the case there the top half of the drum leaks, he can usually identify the area that leaks as the drum is raised from the water and mark it.

If, on the other hand, the leak is below approximately one-half of the drum out of his sight, he merely marks the drum as a leaker and it is routed to another inspector who pressurizes the drum and slowly revolves it in water to find the leak.

It is to be noted that ordinarily drum reconditioning plants operate at speeds from 60 to as much as 600 units per hour. The greater majority operated speeds are between 100 and 300 drums per hour.

In the usual practice one machine is utilized, however, in certain plants, they can be operated as much as 400 per hour, and two machines for example can be operated by two operators and at times the plants may operate as high as 600 per hour. If desired or required, three machines can be operated by three operators and the like. Even under these circumstances, it is sometimes felt that the drum is not being submerged as long as it should be in order to detect the tiniest of leaks.

The operation of the machines in order to cycle at relatively high speeds, does require an operator who must be dexterious in turning the drum as it comes into the machine to achieve the required position and then inserting the selfsealing fitting.

Considering now the method and apparatus of the present invention, it will be noted that the present invention possesses certain important differences and advantages not found nor utilized heretofore. Some of the advantages of the method and apparatus of the present invention are as follows: It can be built in any reasonable number of stages up to, for example, ten stages. It is completely automatic except that an operator is required to look for the bubbles in those drums that leak. He or she can, however, quickly scan a number of compartments of separate tanks built into the machine. There can be used a four drum (stage) unit to illustrate the principle. This tester would permit submerge time, which is very important, equivalent to four individual machines operated by four people.

Figure 6:
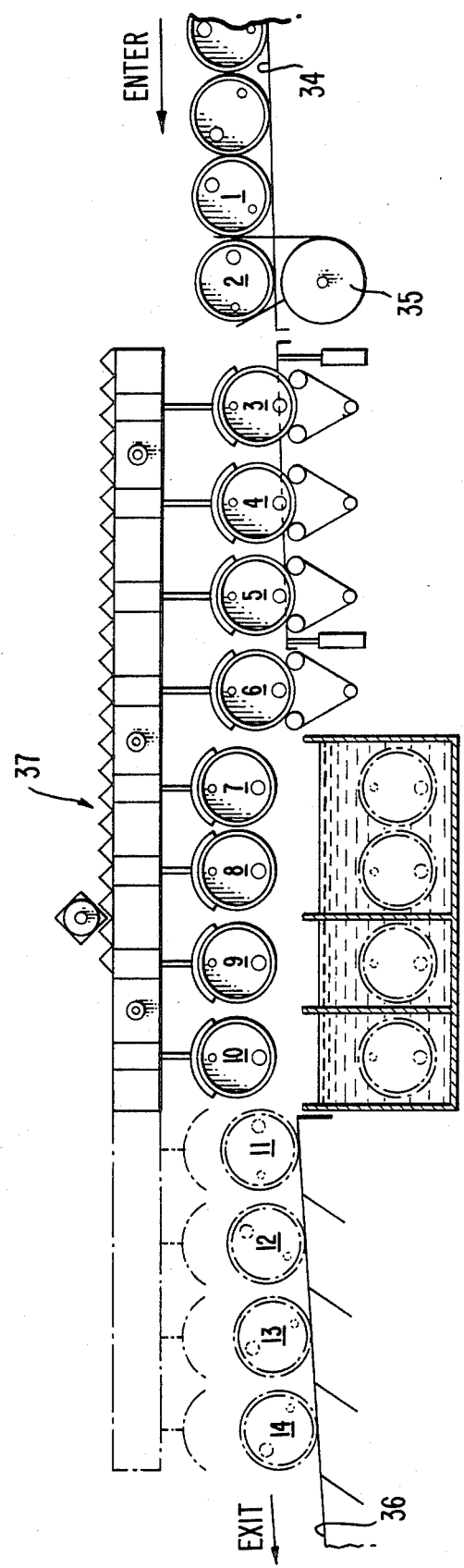
FIG. 6 a schematic view illustrating certain features of the present invention.

With further reference to the present invention, the following is given as a description of the operation starting from the end inclined drum conveyor on the entrance side, see FIG. 6, wherein the operation is illustrated diagramatically or schematically:

1. The drums are delivered to the machine and stored on an inclined gravity conveyor 34 (which could be mechanized if necessary).

2. Drum number 1 is at rest on the inclined conveyor 34 while drum number 2 is at rest on the inclined conveyor, FIG. 6, but confined by the rotating progressive loading device 35 which at that moment is not rotating.

3. Drums 3, 4, 5 and 6 have been previously loaded on the pivot conveyor by the rotation of the progressive loading device 35.

4. As drums 3, 4, 5 and 6 roll into position, drum 6 falls automatically by gravity onto a set of locator rollers and then drums 3, 4 and 5 are lowered onto their respective locating conveyors by the action of the pivot conveyor cylinders that are two in number.

5. As drums 3, 4, 5 and 6 are revolved by their own drive mechanism with an automatic brake, the large bung as it gets to a predetermined uniform low spot is stopped by stopping the loading device so that drums 3, 4, 5 and 6 are precisely and uniformly located as to bung position.

6. The objective then of the drive mechanism with the automatic brake is to precisely locate the bung hole of the drums that each device contains. Precise location means to locate the large 2 inch plug with relationship to a fixed point.

7. After location, cylinders supporting each of the lifting and locating mechanisms lower so that the lifting devices grasp the top of the drum. This can be accomplished by a magnet or a clamping device.

8. After being grasped by the mechanism, drums 3, 4, 5 and 6 are lifted clear of the rotating mechanism and the rack and pinion moving device which supports the lifting mechanism automatically proceeds to move drums 3, 4, 5 and 6 to positions that were occupied by drums 7, 8, 9 and 10. At the same time, drums 7, 8, 9 and 10 have been previously submerged and tested and have been lifted by the same type lifting mechanism.

9. With further reference to FIG. 6 of the drawings, as the rack 37 moves forward, drums 7, 8, 9 and 10 go into the position of 11, 12, 13 and 14 which is an inclined exit conveyor 36.

10. This exit conveyor 36 has a movable chute to let any drum that has been designated as leaking by the operator who pushes a number corresponding to the appropriate section of the conveyor. This diverts the leaking drum down to a special conveyor.

11. At that point, drums 3, 4, 5 and 6 which are now at points 7, 8, 9 and 10 are lowered onto supports just above the water and released onto these supports by the lifting mechanism.

12. At that time individually actuated arms push and slide simultaneously the four drums against four circular rubber sealing devices with holes in their centers to admit air into and out of the drums.

13. Upon receiving a signal from a device that the sealing is complete, air is emitted into the drum automatically and shuts off at 7 pounds pressure.

14. Meanwhile the four drums which are now clamped to this device suspended above water are released and then lowered by means of air or hydraulic cylinders or some lowering mechanism which could include rack and pinion, and the like.

15. As the top of the drum reaches a level just below the surface of the water, the mechanism stops and is held immovable under water for any preset time.

It is to be noted that the amount of time involved is dependent upon the amount of speed required for the number of drums being tested and, of course, that is affected by the number of units that is built into the machine. As an example, in a four unit machine, movement of the pinion gear and rack might take three seconds. Lowering the drums above the solution tanks and pushing them against the sealing collars might take an additional four seconds. To raise the drums would probably take four seconds and the clamping device to attach to the drums and raise them to enable them to be progressed might take two seconds. At sixty cycles per hour, 240 drums per hour could be processed, allowing the drums to be submerged as much as 44 seconds. Actually, not only could the number of stations in the machine be increased, but two machines could be placed side-by-side with a single operator in between for observation.

It indeed might be quite possible, considering the advances in electronics and video technology, to install a viewing device that could be suspended above each of the separate tanks to observe the bubbles, thereby enabling the machine to operate totally automatically without an operator.

Heretofore, the drum reconditioning industry has been plagued in part by the fact that steel drums are being made of lighter and lighter material and as a result the used drums which the reconditioner purchases to recondition and resell on the average are more fragile than they were in days gone by.

Also, the customer is becoming more quality conscious. The penalty for a leak in a drum has increased enormously for both the reconditioner and the filler. There is no practical solution to properly testing a reconditioned drum other than by submerging, which as mentioned above, is being universally done in single unit, single operator machines. The automation referred to above permits the reconditioner, within reasonable economic limits as to space, machinery, and manpower, to eliminate operators that are highly dexterous and physically strong.

Additionally, as far as a new manufactured drum is concerned, because of the unusually high operating speeds, submerge testing is not considered practical although it has been admitted that submerge testing would represent a substantial improvement in testing new drums as compared to the manner in which they are now being tested. This machine used in tandem, side-by-side, 5 to 6 stations each, could reverse the economics of submerge testing and make it practical in new drum manufacturing plants.

It is to be emphasized that the principles of the present invention are applicable to a multiple automatic submerged tester as well as a single automatic submerged tester. One of the reasons for this is that many drum reconditioning plants will not have a need for a multiple tester, but will require a single tester. Another reason is that two single testers could operate with one operator, giving more capacity for a medium sized reconditioning plant. The multiple tester would be suitable only for a large reconditioning plant or a drum manufacturing plant.

While several embodiments of the present invention have been illustrated herein in particular detail, it will be understood that variations and modifications may be effected without departing from the spirit and scope of the novel concepts of this invention.

What is claimed is:

1. A method for simultaneously testing multiple drums for leaks wherein the drums have bung holes, comprising the steps of moving the multiple drum automatically into a predetermined area with a rolling-type conveyor feed, rotating and orienting the multiple drums so that the bung holes are in a 6 o'clock position, next moving the multiple drums to a position where air under pressure can be introduced into the multiple drums, introducing air into the multiple drums, shutting off the supply of air when the air pressure reaches a predetermined pressure, next releasing the multiple drums and lowering the multiple drums into a water-filled testing area, next having an operator simultaneously observe the multiple drums for leaks, and then mechanically lifting the multiple drums from the water filled area.

2. The method as defined in claim 1 wherein a plurality of multiple automatic submerged drum testers is provided for the simultaneous observation by a single operator.

3. The method as defined in claim 1 wherein a vertical rack and pinion machine frame is provided to raise and lower the multiple drums which are held laterally.

4. An apparatus for testing drums for leaks wherein said apparatus is capable of testing multiple drums simultaneously and the drums have bung holes therein, comprising means for automatically moving the multiple drums into a predetermined location, means for rotating and orienting the multiple drums so that the bung holes are in a 6 o'clock position, means for automatically and selectively admitting air under pressure into the multiple drums, means for shutting off the air supply when the air supply reaches a Predetermined pressure, means for releasing and lowering the multiple drums into a water-filled testing tank, means permitting an operator to readily and simultaneously observe the multiple drums for leaks, and means for mechanically lifting the multiple drums from the water.

5. The apparatus as defined in claim 4 wherein the machine and apparatus is a plurality of multiple automatic submerged steel drum testers which are capable of being simultaneously observed by a single operator.

6. The apparatus as defined in claim 5 wherein the apparatus is provided with a rolling-type conveyor feed and with a vertical rack and pinion machine frame for raising and lowering the multiple drums which are held laterally.

7. The structure as defined in claim 6 wherein the drums being tested are of a relatively large size such, as 55 gallon drums.

8. The apparatus as defined in claim 4 wherein the machine can be built in any reasonable number of individual stages.

9. The apparatus as defined in claim 4 wherein the machine is completely automatic, and wherein an operator can look for bubbles in those drums that leak.

10. The apparatus as described in claim 4 and further including suitable electronics and video technology, and a viewing device for, seletively observing the bubbles so as to enable the machine to operate totally automatically without an operator.

11. The structure as defined in claim 4 wherein the machine can be used in new drum manufacturing plants as well as drum reconditioning plants.

12. The structure as defined in claim 4 wherein the testing machine can be used for different sizes of relatively large drums.

13. A completely automatic apparatus for simultaneously testing multiple metal drums such as 55 gallon drums for leaks wherein the drums include a cylinder and ends, the ends of the drums having bung holes therein, said apparatus including means for automatically moving the multiple drums into a predetermined location, means for precisely rotating and orienting the multiple drums so that the bung holes in the ends of the multiple drums are in a 6 o'clock position, means for automatically and selectively admitting air under pressure into the multiple drums, reason for selectively shutting off the air supply when the air supply reaches a predetermined pressure, means for selectively releasing and lowering the multiple drums into a water-filled testing tank, means for permitting an operator to simultaneously observe the multiple metal drums being tested through their ends and not through the cylinders.

14. The structure as defined in claim 13 wherein the apparatus can be used in new drum manufacturing plants as well as reconditioning plants.

15. The apparatus as claimed in claim 14, wherein the apparatus is a plurality of multiple automatic submergered metal drum testers which are capable of being simultaneously observed by a single operator and wherein the machine and apparatus is for metal drums such as 55 gallon steel drums.

16. The apparatus as claimed in claim 13 wherein the apparatus is provided with a rolling-type conveyor feed and with a vertical rack and pinion machine frame for raising and lowering the multiple drums which are held laterally.

17. A method for automatically simultaneously testing a multiple of large drums such as large metal drums so that the multiple drums can be simultaneously tested for leaks, the drums having a cylindrical portion and end portions, the end portions of the drums having bung holes therein so that the bung holes are arranged in the end portions of the drums, comprising the steps of the first moving the multiple drums automatically into a predetermined area with a rolling-type conveyor feed, then rotating and precisely orienting the multiple drums so that the bung holes are in a 6 o'clock position, then moving the multiple drums to a position where air under pressure can be introduced into the ends of the multiple drums, next introducing air into the multiple drums, then shutting off the supply of air when the air pressure reaches a predetermined pressure, then releasing the multiple drums and lowering the multiple drums into a water-filled area. then having an operator simultaneously observe the multiple drums for leaks, and next mechanically lifting the multiple drums from the water-filled area, the multiple drums being tested through their end portions, and not through the cylindrical portions thereof.

18. The method as defined in claim 17 wherein the method is for use in a plurality of multiple automatic submerger testers capable of simultaneous observation by a single operator.

19. The method as defined in claim 17 wherein a vertical rack and pinion frame is provided for raising and lowering the multiple drums which are held laterally.

20. In an automatic apparatus for testing metal drums such as 55 gallon steel drums for leaks wherein the drums include a cylinder and ends, an end of the drums having bung holes therein, means including a gravity conveyor for delivering multiple drums to be tested to the apparatus from a source of supply of drums, said apparatus including means for automatically moving the multiple drums into a predetermined location, means for precisely rotating and orienting the multiple drums so that the bung holes in the ends of the multiple drums are in a 6 o'clock position so that the multiple drums are precisely and uniformly located as to the position of the bung holes, means including sealing device for automatically and selectively admitting air under pressure into the multiple drums through the ends of the multiple drums and for selectively exhausting the air from the multiple drums, means for selectively shutting off the air supply when the air supply reaches a predetermined pressure. means for selectively releasing and lowering the multiple drums into a water-filled testing tank for a preset time, means for permitting an operator to simultaneously observe the multiple drums for leaks, means for mechanically lifting the multiple drums from the water, the multiple metal drums being tested through the ends and not through the cylinders, and means including an exit conveyor and a movable chute so that leaking drums can be conveyed to a desired location.

* * * * *